Sept. 29, 1942.   R. S. WOODARD   2,297,342
CULINARY MASHING DEVICE
Filed Aug. 12, 1939   2 Sheets-Sheet 2
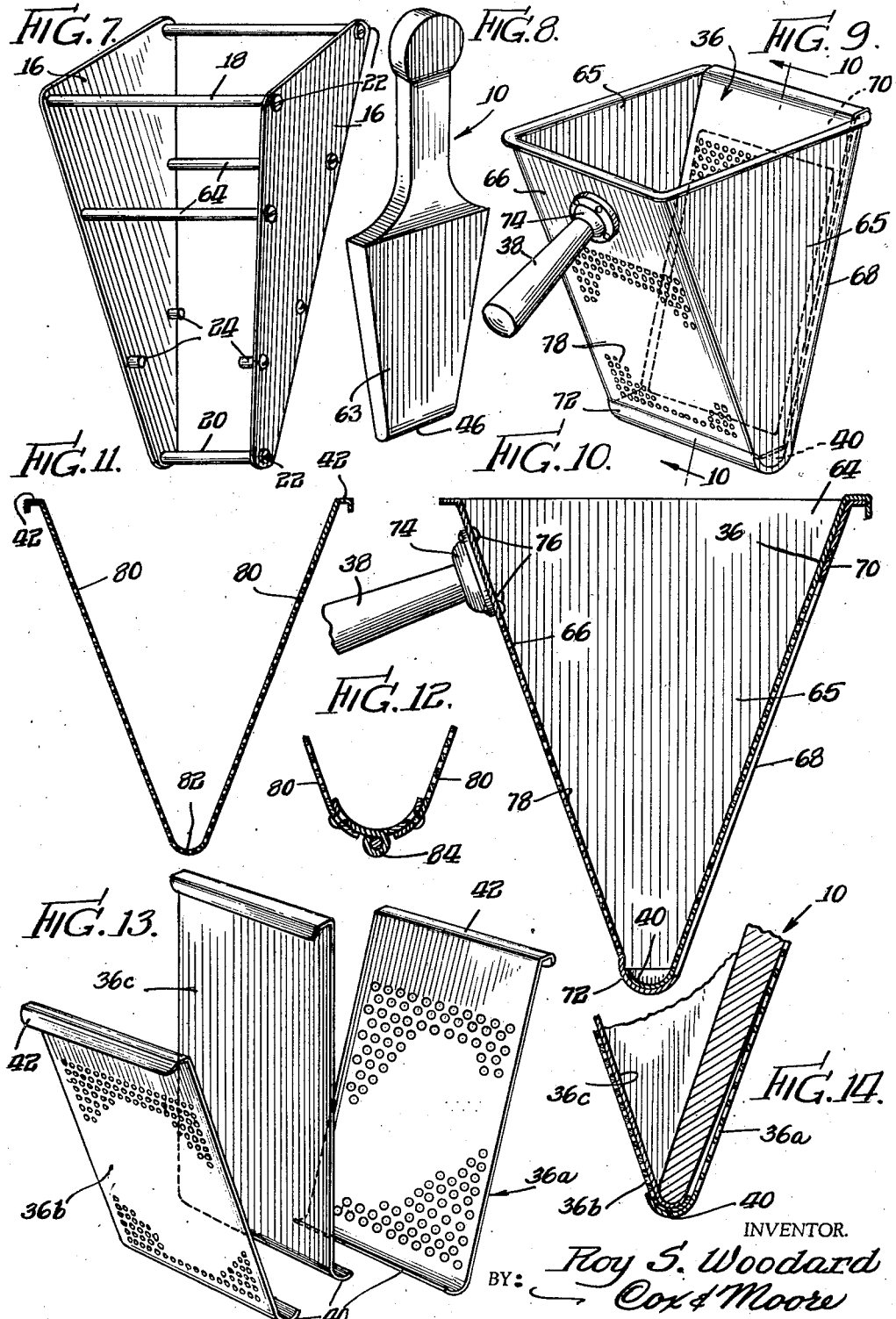
INVENTOR.
Roy S. Woodard
BY Cox & Moore
ATTORNEYS.

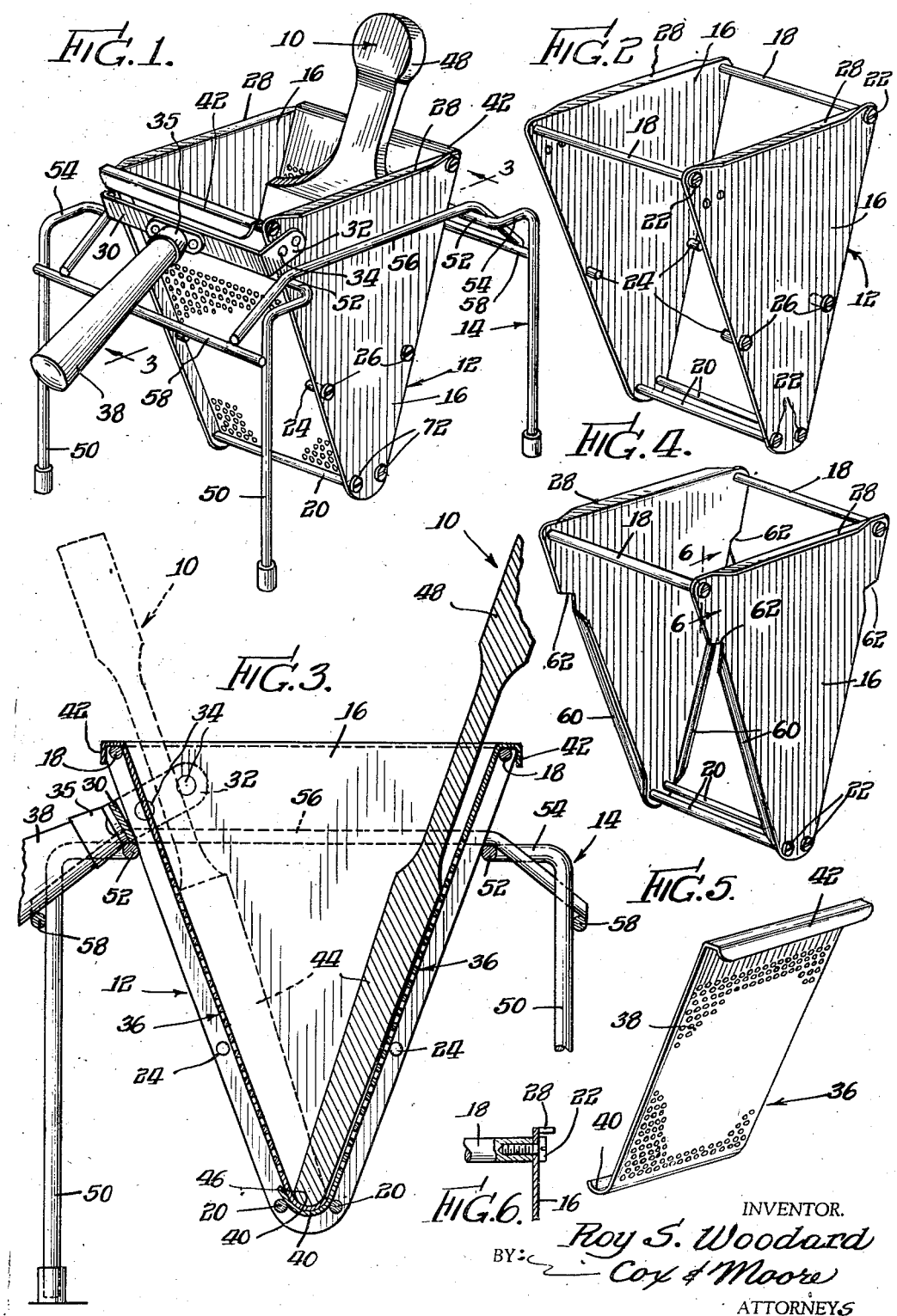

Patented Sept. 29, 1942

2,297,342

UNITED STATES PATENT OFFICE 2,297,342

CULINARY MASHING DEVICE

Roy S. Woodard, Springfield, Tenn.

Application August 12, 1939, Serial No. 289,798

11 Claims. (Cl. 146—173)

The present invention relates in general to culinary utensils and, more specifically, to utensils for pressing, straining, pulping, and ricing fruits and vegetables.

Yet more particularly, the present invention relates to the class of utensils wherein vegetable products are not only reduced to a paste or sauce, but at the same time are subjected to a separating operation to remove and separate continuous masses which are desirably separated from the vegetable pomace, such as, for example, seeds, skins, and the like. In this respect, the present class of utensils must be distinguished from those wherein the vegetable material is enclosed and, under the influence of high pressure, forced in its entirety through a ricing means so that substantially all of the parts thereof are subjected to homogeneous disintegration pulping. In other words, the present device may be classified with those utensils in which the material is subjected to working or repeated movement and squeezing to separate the vegetable matter from the waste pulp and seeds while the mashing of the softer constituents progresses.

The present invention contemplates more particularly the provision of a utensil of the foregoing class which is simple and inexpensive in construction and which in use facilitates the foregoing mashing and separating actions, thus enabling the production of mashed and riced products and sauces expediently and without the certain difficulties inherent in the devices heretofore in use.

The constructions hitherto in use for the present purpose have been characterized in general by the provision of a roller operable to force the material against a perforated support. Characteristic of commercially successful devices of this class have been those employing a conical colander or screen having its apex at the bottom. A pestle or roller having the general coniform configuration or cylinder has an end adapted to seat in the apex of the cone, which thus acts as a fulcrum to permit the pestle to be manually directed about the interior surfaces of the cone by manipulation of the upper end with respect to the fulcrum. This device has been found to be seriously defective in use for many reasons. In the first place, vegetable material placed in the cone and subjected to the rolling action of the roller or crusher tends to progress invariably upwardly along the roller to ultimately collect adjacent the handle portion of the roller. So, also, it will be evident that in the foregoing type of construction the apertures or reticulations of the conical member are necessarily of fixed predetermined size so that no variation is permitted in accordance with the demands of the specific material under treatment. Among other disadvantages of these utensils were the fact that they were difficult to clean, inefficient in pulping and separating ability due to the substantial line contact made by the roller, and impositive in operation.

It is an object of the present invention to overcome the foregoing serious disadvantages by providing a mashing and separating utensil as above, wherein a paddle cooperates with opposed angularly disposed perforated or foraminated members to approach said members in generally flatwise relationship for working and mashing the material.

Yet more particularly it is an object of the present invention to provide a construction as above in which the reticulated walls form a portion of a hopper construction, the paddle being relatively flat and adapted to reciprocate about a pivot point adjacent the point of convergence of the said walls. It is important to note that as a result of this arrangement the material in the hopper no longer finds its way to the upper or handle portion of the paddle, being readily retained in the perforate portion of the hopper by the action of the paddle.

The present invention more particularly contemplates the provision of the hopper construction as above adaptable for use with a flat paddle, comprising a frame with material retaining walls supported and joined by spacer bars or frame members adapted to separably or removably support the perforated walls in order that these last named walls may be freely removed or substituted.

It is accordingly an additional object of the present invention to provide a separable hopper construction as above in which the food mashing and ricing portions as well as the paddle journaling portion are freely removable for cleaning.

Another object of the present invention is to provide a food mashing construction with the perforated strainer portions which may be freely varied as to the effective size of the aperture to assist in separation of pulp, seeds or other continuous foreign matter regardless of the size of particles.

Among other objects of the present invention are to provide a separating utensil for converting food products to sauce and the like as above by angular relative approach of a flat pressing surface to a foraminated wall whereby the material is somewhat compressed between the approaching surfaces while limiting the degree of compression and creating a tendency for the material to flow laterally by virtue of the relative angular disposition of the parts; to obviate the line contact pressure of the roller type construction hitherto in use for promoting and increasing the separating and mashing efficiency; and to provide a simplified construction which may be produced inexpensively and particularly from non-corrosive materials such as stainless steel thus adapted for use with corrosive food products such as fruit acids which would otherwise cause the absorption of a harmful proportion of metallic salt. Numerous other objects and advantages of the present invention will be apparent from a perusal of the following specification when taken in connection with the accompanying drawings, wherein:

Figure 1 is a perspective view of a culinary device embodying many of the principles of the present invention shown for illustrative purposes.

Figure 2 is a perspective view of an outer supporting portion of the utensil hopper with the supporting frame, paddle and reticulated members removed.

Figure 3 is a sectional view taken centrally through the construction of Figure 1 on the line 3—3 thereof.

Figure 4 is a perspective view similar to Figure 2 showing a slightly modified form of construction.

Figure 6 is a detailed sectional view taken on the line 6—6 of Figure 4.

Figure 5 is a perspective view of one of the plates forming a reticulated and perforated side wall of the hopper, the plate being shown in separate relationship.

Figure 7 is another perspective view similar to Figs. 2 and 4 of a slightly modified form of construction.

Figure 8 is a perspective view of a paddle for use with the form of construction shown in Figure 7.

Figure 9 is a perspective view of a yet further modified form of mashing a ricing hopper having only one removable side or mashing wall.

Figure 10 is a sectional view taken centrally through the hopper, Fig. 9 on the line 10—10 thereof.

Figure 11 is a single section perforated member adapted for cooperation with any of the foregoing hopper frames removable in a single piece.

Figure 12 is a sectional view taken centrally through a perforated member of the character shown in Fig. 11 but having a hinged bottom thereof to facilitate cleaning.

Figure 13 is a perspective view of a pair of separable side plates illustrating the manner of cooperation with a blank or imperforate separable wall member adapted to cover either of the perforated members selectively.

Figure 14 is a detailed sectional view taken centrally through a hopper construction and paddle indicating the use of the imperforate or blank wall member of Figure 13.

Referring now to the drawings wherein the present invention is illustrated more in detail, Figures 1, 2 and 3 disclose one contemplated form of separating and mashing utensil contemplated in accordance with the present invention and comprising a paddle 10, a foraminated hopper or colander member 12, and a supporting stand 14.

The hopper 12 comprises in general an outer hopper frame shown in detail in Figure 2 composed of retaining walls 16 of triangular form held in spaced parallel relationship by spacer bars or frame members 18 joined to the plate 16 at their extremities by fasteners 22. It should be particularly noted that the present construction comprises a downwardly tapered wedge-shaped frame or cage having blank or imperforate spaced triangular hopper walls, the intermediate angularly disposed faces being substantially open as will hereinafter appear more in detail. The present invention contemplates the separable location adjacent these angularly disposed faces of perforate dicing walls and it should be noted that in order to accurately support these walls and members are provided a pair of studs 24 located between each pair of bars 18 and 20 which studs project oppositely inwardly from the hopper wall 16 and are secured by fasteners 26. It has been found further that by flanging over the upper extremities of the wall 16 as at 28, supply and handling of the hopper frame is facilitated.

The hopper frame is shown more clearly in Figure 1 as additionally provided with a handle construction since the manual working or reciprocation which takes place during the manipulation of the present utensil necessitates firm retention of the assembly. To this end a yoke or strap 30 having laterally formed flanged extremities 32, spot welded or riveted to the respective side walls 16 as at 34, bridges the wall 16 adjacent the upper portion of the hopper frame and supports at an intermediate point, a bushing 35 mounting a handle 38. While Figure 2 illustrates the structure with the handle removed, it is important to note that the entire handle construction is rigidly and permanently a part of the final supporting frame and serves for handling and holding the assembly at all times.

As will be seen in Figure 3 the hopper frame or cage serves to operatively support a pair of angularly disposed perforate members 36 which complete the hopper walls, the wall members being shown more clearly in Figure 5. Attention is directed to the fact that each of these separable perforate members may be formed from a sheet of flat material with regularly formed apertures of predetermined size, on a pre-selected portion of the surface thereof. Yet more specifically, it will be evident that the side plates or walls may be formed from ordinary strip stock having a central portion foraminated as at 38. The lower extremity of each strip is folded arcuately as at 40 so that the arcuate portions interlap as clearly shown in Figure 3 to seal the bottom of the hopper assembly and provide a fulcrum journal for the paddle member as will hereinafter more fully appear. Attention is particularly invited to the manner in which the lower curved flange 40 rests upon the spacing bars 20 in supported relationship. The upper extremities of the foraminous plates 36 are flanged over as at 42 to embrace the upper spacer bars 18 (Figure 3). The flanges 42 provide finger gripping portions for facilitating lifting of the removable sections and likewise engage the upper bar 18 to prevent the plate 36 from being laterally dislodged. Thus it will be obvious from the foregoing that the foraminous angular walls or plates 36 freely rest upon bars 18 and 20 and are supported against outward bulging by the inwardly projecting studs 24, being accordingly firmly mounted in the pre-determined relationship shown while at the same time being freely removable or separable from the supporting frame by mere upward manipulation.

As a result, therefore, each marginal portion of each of the triangular walls or members is disposed in parallelism with a corresponding margin on the spaced wall member. Since each wall is generally triangular in form, its side margins are disposed in converging or angular relationship. Accordingly, therefore, the downwardly converging margins of a retaining wall member each cooperate with a parallel margin on the spaced retaining wall member to define open side portions having upstanding parallel margins. By virtue of the angular relation of the side margins of each triangular wall, the upwardly extending open side faces are arranged in downwardly converging or angularly disposed planes. Thus, it will be apparent that downwardly converging marginal portions of each retaining wall, when so arranged opposite a complementary wall, cooperate to define the open side faces as defined in the present specification and claims.

The paddle 10 comprises a flat body portion 44 of predetermined width adapted to be accommodated between the parallel walls 16 of the hopper and having an arcuate lower surface 46 which, as clearly shown in Figure 3, resides within the upper arcuate flange 40 and thereby fulcrums the entire paddle for pivotal oscillation between the positions indicated by the full and dotted lines in Figure 3. In the embodiment shown the flat body portion 44 extends up substantially to the limit of the foraminous areas 38 and is then narrowed to form a handle portion 48. It is of great significance that the flat body portion extends substantially between the imperforate parallel side walls 16 of the hopper frame so that material within the hopper and in the angular bight between one side of the paddle and the adjacent perforate wall 36 is substantially retained upon this respective side of the paddle during oscillation and accordingly is subjected to material "working" as well as straining as the respective wall and paddle surface are caused to approach.

The entire hopper assembly must necessarily be arranged over a receptacle for the mashed comminuted product which emanates from the apertures, wherefore the supporting stand 14 has four laterally offset legs 50. It will be noted that each lateral pair of side legs is formed from a continuous length of material forming a transversely extending bar 52 integral with the legs 50 and laterally extending arms 54. The hopper rests and is directly supported upon the opposed bars 52 shown in Figures 1 and 3 which bars are held in spaced relationship by longitudinal spacing bars 56 permanently joined to the bars 52 by welding. The bars 56 extend past the point of contact with the transverse supporting bars 52 and are bent downwardly to engage the transversely extending spacer bars 58 parallel with bars 52. It is important to note that spacer bars 58 are welded at their extremities to the upright legs 50. It is particularly important to note that the transverse bar 58 is moreover arranged at an elevation a predetermined distance below the transverse bar 52 to receive the handle 38 which is disposed at a slight inclination with respect to the hopper. As a result of this construction as clearly disclosed in Figures 1 and 3 the handle impinges and rests upon the transverse spacing bar 58 when the hopper is mounted upon the stand 14. Thus the hopper, while being freely separable from the stand is not only supported by the spacer bars 52 but is additionally held against angular displacement by one of the bars 58. By virtue of this arrangement it will be accordingly obvious that a firm rigid support is provided since the operator grasping the handle 38 will normally tend to force the handle against the bar 58 in which limiting position the hopper will stand firmly engaged against dislodgement. In other words, it is clearly impossible for the present utensil to tilt out of engagement with the supporting stand irrespective of the violence or magnitude of force applied to the paddle.

The foregoing construction is placed in operation by assembling the device as shown in Figure 1 and inserting into the hopper or colander small pieces of the material to be mashed or riced, which pieces immediately take a position in the angular space between a side of the paddle and an opposite foraminous plate 36. The paddle is grasped by the handle portion 48 and oscillated about its lower portion as a fulcrum to approach the said apertured wall, at which time the food product is subjected to a compressive or mashing action. It is particularly important to note however that since the surfaces which compress the product approach at a gradually diminishing angular relationship the pressure is not applied positively; that is to say the material is not positively forced through the adjacent apertures for the reason that it is at no time enclosed or retained adjacent its upper portions and accordingly may flow laterally or in the plane of the apertured plate to relieve excessive pressures. To better explain the function of the device let it be assumed that the material under treatment comprises apples which when cooked are to be formed into a sauce or paste-like material, while removing the skins, seeds and fibrous portions of the core. As the pieces of apple therefore are worked adjacent the plates 36 the more fluid portions thereof under the limited compressive forces tend to flow through the apertures while the portions unsuitable for such passage, upon the application of greater force, tend to move laterally as the paddle surface approaches the respective perforated wall. It will be evident that this upward tendency to flow applied repeatedly will ultimately break down the pulpy portions of the fruit to a paste-like or mashed product ultimately suitable for passage through the apertures. On the other hand, the continuous or relative solid portions which it is desired to separate will not so soften under the limited pressures which are available. It will be noted, moreover, that the resultant tendency to lateral flow in the material under treatment moves the unstrained material with respect to the apertures of the foraminous walls to prevent clogging thereof. From the foregoing it will be appreciated that the action of the present device is one of gradually "working" or kneading the material to separate the solid or continuous matter from those vegetable components which are readily reduced to paste, combined with the action of pressing the resultant paste through the perforations whence they drop to a receptacle not shown. The present device must therefore for this reason be clearly distinguished from those mashing and ricing constructions in which pressure is positively applied to force the entire vegetable product including all its components through a comminuting screen. Such devices require the application of continuous high pressure to produce a product entirely unsuitable for the present purpose. At the same time the instant device is characterized by a materially improved separating and mashing efficiency over those constructions wherein a roller applies working forces necessarily along a substantially straight line of contact. Thus the action of a roller is not only inferior insofar as the application of working and mashing actions is concerned but naturally and ultimately results, as is well known, in the material being forced upwardly until it reaches the upper rim of the colander. Impracticability of continuously cleaning the material from the handle portion and from the upper rim of the colander has been one of the characteristic defects of the prior devices. In accordance with the present invention, however, any material which flows upwardly, immediately tends to flow downwardly in the hopper as the paddle is reciprocated reversely. Should at any time any viscous materials accumulate ultimately at an undesired elevation, it is a simple matter to simply lift the paddle and push it down the appropriate wall to again bring all of the material to the lower part of the hopper. This is of great convenience to the culinary operator. The foregoing separating action naturally results in a mass of separated pieces or particles which accumulate in the bottom of the container and in many previous known devices it has been necessary to resort to special steps for removing or dislodging this material after the treatment operation. In accordance with the present invention as will be at once obvious it is simple to lift out the two plates 36 for removing the waste material which will obviously accumulate adjacent the bottom or curved portion 40.

I have shown in Figure 4 a slightly modified form of hopper cage or frame in which the opposed side walls 16 are flanged laterally as at 60 along the angularly disposed lateral margins thereof, the flanges 60 obviously serving to support and retain the removable perforate plates 36. This construction therefore obviates the necessity for studs 24 described in the previous embodiment. It will be understood that since the oscillation of the paddle 10 may result in a considerable application of force to the wall or plate 36 that some marginal support of this character is desirable. Accordingly the flanges 60 resist bulging and prevent dislodgement of the perforate plate from its supporting frame.

It is also of great importance to note that in forming or flanging over the margins or walls 16 to provide the flanges 60, a shoulder or notch 62 is provided at the upward extremity thereof. It is contemplated that these notches may be arranged so as to interlockingly engage and rest upon the bars 52 when the hopper is in upward relation upon its supporting standard.

I have shown in Figures 7 and 8 a yet further modified form of hopper frame different from the construction hitherto described in that the tapered side walls 16 gradually converge toward the lower extremities instead of being arranged in parallel planes as before. In order that the paddle may serve to substantially separate opposite portions of the hopper I have provided in this embodiment a paddle having a configuration clearly shown in Figure 8, namely, with a lower or body portion 63 which tapers downwardly in substantial conformation to the downward convergency of the two side walls 16. This embodiment comprehends the provision of a single spacing bar 20 residing just beneath the arcuate portions of the foraminated members. In accordance with another important feature of this embodiment there is provided a pair of wiper bars 64 extending between the imperforate plates 16 and arranged so that they will reside normally just above or adjacent the perforate area of the plates when the plates are in operative position. The wiper bars 64 are so arranged that they reside against the perforate surface during withdrawal. Accordingly, it will be evident that as the plates are withdrawn upwardly in contact with the bars 18 and 64 the latter bars serve to scrape or wipe clean the outer surface of the plates 36. It will be evident that this is of important significance since vegetable materials caused to pass through the apertures in mashed or pasty form will obviously resist separation from the plates and tend to adhere to the outer portions thereof.

In Figures 9 and 10 I have shown yet further modifications of the present invention which embodiment employs only a single removable plate 36. It is important to note in accordance with this preferred embodiment, the hopper cage or frame is formed of a continuous piece of metal having opposed imperforate side walls 65 continuous with a rear wall 66; that is to say the side walls 65 are formed by bending the material laterally at the margins of the rear wall. The material is again bent at the opposite angularly disposed margins of the wedge-shaped side walls to provide flanges 68 performing a function similar to the flanges hereinbefore described. Adjacent the upper portions the flanges are continued across the front wall and centrally joined to provide a spacing wall 70. The front portion or side therefore of the hopper provides an opening of considerable extent adapted to be occupied and closed by a perforate removable wall 36 such as heretofore described in detail. Attention is directed to the fact that the lower extremity of the wall 66 is provided with an arcuate lip 72 providing a slight recess adapted to receive the extremity of curved flange 40 as clearly shown in Figure 10. This inter-association of the elements, it has been found prevents inadvertent dislodgement of the perforated plate. Handle member 38 is mounted upon the rear wall 66 by means of a bracket 74 fastened to the wall as at 76. In accordance with the present embodiment I have shown the permanent wall 66 perforated as at 78. The perforation 78 may be omitted if desired. In such case it will be obviously necessary to observe the practice of arranging the material to be mashed only on the side of the paddle adjacent the perforated wall.

Figure 11 discloses a single section foraminated member adapted to occupy both angularly disposed portions of the hopper or colander. This member may similarly be formed out of a single piece of foraminated sheet stock and has been formed to provide angularly disposed side walls 80 joined by an arcuately extending portion 82 to receive the extremity of the paddle as hereinbefore described. The extremities of the strip are provided with outwardly and reversely extending flanges 42 as hereinbefore described. Obviously this single section member may be substituted for the dual plates 36 in any of the foregoing embodiments.

I have disclosed in Figure 12 a yet further detailed modification related to the embodiment shown in Figure 10 and where instead of a single continuous length of perforate material I provide two sections 80 joined at their lower extremities by means of a hinge 84 which provides a curved receiving surface as hereinbefore described. It will be obvious from the foregoing that the hinge construction greatly facilitates removal and cleaning of the fibrous continuous pieces and particles of separated material which accumulate at this point and might otherwise be difficult to remove.

Figures 13 and 14 illustrate a preferred modification of the present invention which exemplifies the wide scope of utility which characterizes the present utensil. Thus there are disclosed two foraminous separable pairs of plates designated respectively by the reference numeral 36a and 36b, which plates differ solely in respect to the size of the perforations. Thus for example the foraminations of plate 36a may all be of the order and magnitude of $\frac{1}{16}$ of an inch, whereas the surface of plate 36b may consist of apertures $\frac{1}{32}$ of an inch in diameter. A further plate 36c is provided of continuous sheet of material free from perforations and adapted to be substituted either for one of the plates 36a and 36b or to reside over and cover the respective plate when placed interiorly of the assembly. Thus, for example, plates 36a and 36b may be assembled in a hopper frame such as shown in Figure 1. In instances where it is desired to employ a utensil having the larger apertures, then the plate 36c will be positioned in the hopper as clearly shown in Figure 14 to reside above the plate 36b and close off the apertures therein. When so used the material to be mashed will of course be introduced on the opposite side of the paddle. If it is desired to rice or mash the material through holes of smaller aperture then the imperforate plate 36c is reversed to reside over the opposite perforate plate 36a, and the material is introduced on the appropriate side of the paddle.

Particular attention is directed to the fact that proceeding in this manner the material under treatment may be acted upon by a utensil having the most appropriate sized apertures in the foraminous portions. Separation of the seeds from strawberries while manufacturing a sauce thereof may be readily accomplished provided the foraminous plate has apertures of predetermined relatively small size. On the other hand, such a plate is obviously undesirable in separating portions of skins and seeds from apple in making applesauce. Accordingly the present invention permits a single pair of perforate plates to provide a dual function, that is of cooperating to promote the efficient treatment of material of varying character. Where it is desired to use both perforate walls of the colander at all times, additional paired plates may be provided each having corresponding perforate portions. Substitution may be made in accordance with the character of the material under treatment.

From the foregoing it will be seen that the present invention provides an improved and simplified culinary utensil which permits the production of mashed and strained products rapidly and expeditiously. It is obvious that the foregoing structure may be provided by simple forming methods out of ordinary sheet or bar stock whereby the invention is readily applicable to manufacture from acid and alkaline resisting materials such as stainless steel, which material is relatively difficult to form and shape in articles of complex form. It will be seen that the present construction provides flat wall surfaces which may be shaped by the simplest form of bending or curving operations from standard perforate and imperforate stock. In this connection difficulty has been hitherto experienced in forming perforations of the desired character especially curved and configurated surfaces such as the conical culinary utensil hitherto in use. In the present device the foraminous sections of the device are located upon flat regular wall surfaces and readily lend themselves to manufacture from sheet foraminated strips for simple stamping operations.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A culinary utensil of the class described, comprising a colander or hopper having a hopper frame formed of spaced triangular retaining walls arranged with their converging margins cooperating to define angularly disposed open side faces, foraminated wall members associated with said open side faces, said hopper frame having supporting portions interengaging said walls in supporting relationship, at least one of said foraminated wall members having an arcuate lower portion adapted to form an enclosing bottom wall for the hopper and a paddle fulcrumed in said arcuate lower portion for angular shiftable movement into flatwise cooperative relation with either foraminated wall member, and having a handle extending out of said hopper for manual operation.

2. A culinary utensil of the class described, comprising a colander or hopper having a hopper frame formed of spaced triangular retaining walls arranged with their converging margins cooperating to define angularly disposed open side faces and flat foraminated wall members associated with said open side faces, said hopper frame having supporting portions interengaging said walls in supporting relationship, at least one of said foraminated wall members having an arcuate lower flange adapted to form an enclosing bottom wall for the hopper, and a paddle member generally coextensive in width with said foraminated walls and having a lower edge adapted to cooperate with said arcuate flange to fulcrum said paddle member for angular movement between said foraminated wall members.

3. A culinary utensil of the class described, comprising a colander or hopper having spaced coextensive retaining walls and spacer members extending between said walls, downwardly converging foraminated wall sections angularly disposed upon said members being freely removable therefrom, said wall sections having overlapping lower portions to enclose the bottom of the hopper, and being adapted to pivotally fulcrum the extremity of a flat paddle member for arcuate oscillation between the said angularly disposed members, at least one of said spacer members residing adjacent a foraminated wall member intermediate of its extremities, being adapted to scrape the sieved product from the outer surfaces of said member as it is lifted from the supporting members.

4. A culinary utensil of the class described comprising a colander defined by downwardly converging spaced substantially flat side walls and lateral retaining walls extending between the said converging side walls, at least one of said side walls being provided with characteristic colander foraminations, said utensil having an open top defined by the upper margins of said walls, a substantially flat paddle member disposed in a plane extending between said lateral retaining walls and being fulcrumed about an axis in the apex between said converging side walls, said paddle being angularly shiftable with respect to said fulcrum and having a handle extending upwardly out of the open top of said utensil and manually shiftable with said paddle to alternately bring the paddle into flatwise juxtaposition with either side wall.

5. A culinary utensil of the class described comprising a colander defined by downwardly converging spaced substantially flat side walls and lateral retaining walls extending between the said converging side walls, at least one of said side walls being provided with characteristic colander foraminations, said utensil having an open top defined by the upper margins of said walls, a substantially flat paddle member disposed in a plane extending between said lateral retaining walls and being fulcrumed about an axis in the apex between said converging side walls, said paddle extending between the lateral retaining walls to divide the colander into spaced compartments on either side of said paddle and being angularly shiftable with respect to said fulcrum and having a handle extending upwardly out of the open top of said utensil and manually shiftable with said paddle to alternately bring the paddle into flatwise juxtaposition with either side wall.

6. A culinary utensil of the class described comprising a colander defined by downwardly converging spaced substantially flat side walls and lateral retaining walls extending between the said converging side walls, at least one of said side walls being provided with characteristic colander foraminations, said utensil having an open top defined by the upper margins of said walls, a freely removable substantially flat paddle member disposed in a plane extending between said lateral retaining walls and resting in the apex between said converging side walls for angular movement about an axis parallel to said side walls, said paddle being angularly shiftable with respect to said axis and having a handle extending upwardly out of the open top of said utensil and manually shiftable with said paddle to alternately bring the paddle into flatwise juxtaposition with either side wall.

7. A culinary utensil as defined in claim 4 wherein said lateral retaining walls are provided with extensions disposed outwardly adjacent at least one of said side walls and wherein the side wall rests thereon and is freely separable therefrom.

8. A culinary utensil as defined in claim 4 wherein one of said side walls is provided with a lower curved extension complementarily receiving the lower marginal edge of the paddle for removably fulcruming the paddle within the colander.

9. A culinary utensil as defined in claim 4 wherein both of said converging side walls are foraminated.

10. A culinary utensil of the class described, comprising a colander or hopper having a hopper frame comprising spaced triangular retaining walls with downwardly converging spaced margins cooperating to define angularly disposed open side faces, downwardly converging wall members disposed in said open side faces, at least one of said wall members being foraminated, said hopper frame having supporting portions interengaging said walls in supporting relationship, at least one of said wall members having an arcuate lower flange adapted to form an enclosing bottom wall for the hopper, and a paddle generally coextensive in width with said wall members and having a lower edge adapted to cooperate with the arcuate flange to fulcrum the paddle for angular movement between said wall members.

11. A culinary utensil of the class described comprising a colander or hopper having spaced substantially coextensive retaining walls and spacer members extending between said walls, a downwardly inclined foraminated wall section disposed upon said spacer members and freely removable therefrom, at least one of said spacer members residing closely adjacent the foraminated wall member and being adapted to scrape the sieved product from the outer surface of the wall section as it is lifted from the supporting means.

ROY S. WOODARD.